April 1, 1952 — W. T. GREEN — 2,590,961
SEALING RING
Filed May 14, 1949
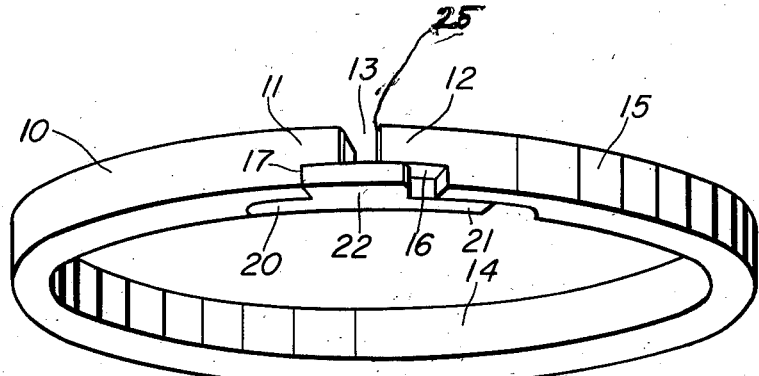
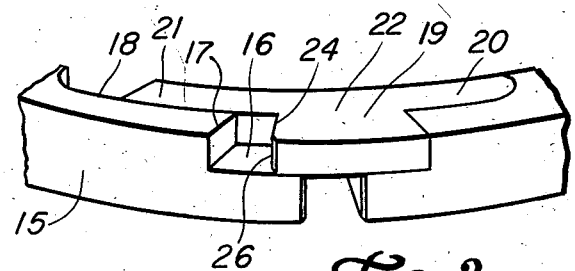
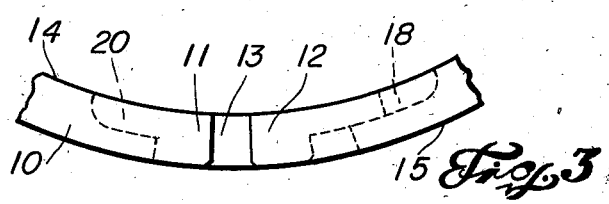
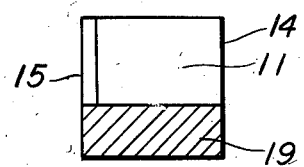
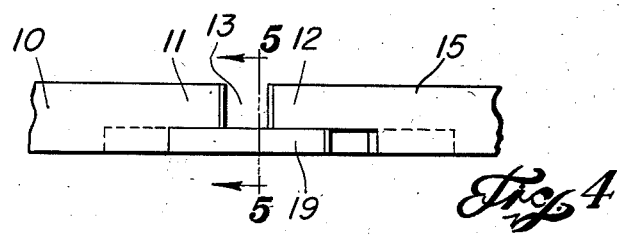
Inventor
William T. Green Patented Apr. 1, 1952

2,590,961

UNITED STATES PATENT OFFICE 2,590,961

SEALING RING

William T. Green, Fort Worth, Tex., assignor to Double Seal Ring Company, Fort Worth, Tex., a corporation of Texas Application May 14, 1949, Serial No. 93,365

7 Claims. (Cl. 309—47)

1

This invention relates to new and useful improvements in sealing rings.

One object of the invention is to provide an improved sealing ring or piston ring having a sealing member which is less likely of fatigue failure and which therefore readily lends itself for use in irregular, such as scored, tapered or wavy cylinders and to rings of narrow width.

Another object of the invention is to provide an improved piston ring having a sealing member which may be formed of metal different from that of the ring body and which extends, radially entirely across the gap, whereby a narrow tongue and groove joint may be used and the requisite strength provided.

Still another object of the invention is to provide an improved sealing ring wherein the free portion of the sealing member which extends across the gap and makes contact with the cylinder wall, is so greatly reduced as to considerably lessen the perpendicular moments, which cause bending which latter results in ultimate failure; and wherein the tongue being narrow in face dimension and wider in radial thickness, whereby the moment of inertia of the cross-section is considerably reduced and which, has a direct proportionate effect on the fatigue point resulting from moments applied perpendicularly to the radial thickness of said member.

A further object of the invention is to provide an improved ring wherein the outer corners of the ring gap are beveled, whereby danger of the edges catching on a recess or opening in the cylinder wall is greatly reduced.

Still a further object of the invention is to provide an improved sealing ring wherein the free extension of the sealing member, which prevents radial leakage, is held in position on the inner-circumference of the ring thus tending to reduce the inherent tendency of the extending member to protrude tangentially when not completely restrained, i. e., when the ring passes an irregularity or opening in the cylinder wall.

A construction designed to carry out the invention will be hereinafter described together with other features of the invention.

The invention will be more readily understood from a reading of the following specification and by reference to the accompanying drawing, therein an example of the invention is shown, and wherein:

2

Fig. 1 is a perspective view of an expanded sealing ring constructed in accordance with the invention and looking at the bottom of the ring.

Fig. 2 is a perspective of the sealing portion of the ring, inverted with respect to Fig. 1, Fig. 3 is a plan view of the sealing portion of the ring shown in Fig. 1, Fig. 4 is a face view of the same, and Fig. 5 is an enlarged transverse or radial sectional view taken on the line 5—5 of Fig. 4.

In the drawing the numeral 10, designates the annulus or body of a one piece sealing ring, which may also be used as a full sealing type piston ring. The ring is made of metal or material best suited for its intended use.

The ring is split radially and is resilient and its ends 11 and 12 are separated by a radial gap 13, extending from the inner annular face 14 of the ring to the outer annular face thereof. The ring may be formed in any suitable manner and when its ends 11 and 12 are forced together the ring will possess the required tension or resiliency to hold it in contact with the cylinder wall.

Each end 11 and 12 is stepped or cut back from the gap to form steps or lands 16, which face downwardly, since the metal of the ring is cut out of the bottom of the ring and these steps extend from the inner face 14 to the outer face 15, radially of the ring and horizontally with respect to its vertical axis. It will be observed that the vertical thickness of each step is considerably greater than one-half the vertical thickness of the ring. The formation of the steps results in vertical and radial shoulders 17 at their inner ends, their outer ends being at the gap 13.

From the inner edge of each shoulder 17, a groove 18, in the inner side of the ring, extends circumferentially; said groove being formed in the bottom of the ring and having its top flush with the flat surface of the step and being a continuation of the same. Each groove has a radial width, preferably, less than one-half the radial width of the ring. The surfaces of the grooves and steps are finished smooth.

A seal member or block 19 is seated on the steps 16. This block is preferably of uniform thickness throughout and has its bottom surface flush with the bottom of the ring and its top surface forming the bottom of the gap 13. The block has oppositely directed tongues 20 and 21 on its inner side fitting in the grooves 18. The tongue 20 is sealed in the groove 18 on the end 11 and is such size and shape as to completely fill the same.

The medial portion or body 22 of the block has its inner and outer faces conforming to the contours of the ring faces 14 and 15 and flush therewith. The block bridges the gap 13 and has a radial shoulder 24 which abuts the shoulder 17 of the end 11, when the tongue 20 fills the groove 18 of said end. The block is brazed, welded or otherwise secured in the groove and said block is likewise secured on the step 16 and to the shoulder 17 of the end 11.

The block has a free sliding fit on the step 16 of the end 12 and its tongue 21 has like engagement in the groove 18 of said end. The body 22 is of such length, circumferentially that when the ends 11 and 12 of the ring abut, the shoulder 24 on the free end of the body will either contact or lie close to the shoulder 17 of the end 12. The end of the tongue 21 may be cut off so as not to engage the end of the groove, when the gap 13 is closed. The outer vertical edges of ends 11 and 12 are beveled at 25 and the outer vertical edges of the block 19 are likewise beveled at 26.

It is pointed out that the sealing member or block 19 may be made of alloy steel or other suitable material and extends completely across the radial thickness of the bottom side of the ring, overlapping the gap 13 on the cylinder wall (not shown) but only to an extent necessary to give a complete seal during the life of the ring. It is obvious that as the ring wears the ends 11 and 12, which are quite close together when the ring is compressed in the cylinder, will gradually separate. It will be observed that only the outer face of the body 22 of the sealing member 19 contacts the cylinder wall and as this area is comparatively small the possibility of scoring cylinders or liners, as occurs in the present day rings, is reduced to a minimum.

Due to the fact that the sealing member extends across the entire radial thickness of the ring, equivalent or greater strength to rings now in use, particularly those having sliding tongues or overlapping steps, can be obtained with a sliding tongue which is considerably narrower in width and this permits the use of a ring which is quite narrow in width, thus making it permissible for use in equipment with extremely narrow grooves which to date have been restricted to the use of rings having no overlapping or sealing ends. By making the tongue narrow in width the recessed or grooved side of the ring is considerably stronger because less material is removed than in the usual practice. It is pointed out that it is the friction forces acting on the face of a ring that results in ultimate failure of the end of a ring or a sealing member and this is minimized in the ring herein presented.

The possibility of fatigue failure of the sealing member and particularly its tongues, is considerably reduced over those rings which have tongues because of the reason that the free portion of the tongue extending across the gap and making contact with the cylinder wall, is so greatly reduced, as to considerably lessen the perpendicular moments, which cause bending, which results in ultimate failure. It is further strengthened by the fact that due to the cross-section of the sealing member which is considerably narrow in face dimension and wider in radial thickness, the moment of inertia of the cross-section is considerably reduced which has a direct proportionate effect on the fatigue point resulting from moments applied perpendicularly to the radial thickness dimension.

The usual ring which is provided with a sliding tongue or overlapping portions, has a tongue or overlapping portions which are of such length, or which extends beyond the end of the ring along the outer-circumference to such a degree as to make it more dangerous from the standpoint of catching in recesses or, for instance, ports in a cylinder wall. This results from the normal tension of the ring, causing the tongue to spring outward radially when it encounters a recess in the cylinder wall and thus, in the invention herein set forth by having the extended tongue 21 on the inner-circumference of the ring, the end of the ring 12 has an inherent tendency to restrain any tendency of the sealing member 19 from extending tangentially outside the normal circumference of the ring while passing recesses in the cylinder wall. The possibility of the ends, 11 or 12, of the ring or the shoulder 24 of the sealing member 19 of catching in recesses in the cylinder wall are further reduced by bevels on the surfaces, numbers 25 and 26. These features of the ring make it extremely valuable for use in two cycle engines or in cylinders having intake or exhaust ports or cylinders that are excessively worn or irregular.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A sealing ring including, a split annulus having a radial gap at its split and undercut steps cut circumferentially back from its split ends and extending radially from its inner face to its outer face, the ends of the ring having circumferential grooves in its inner face extending from the steps, and a sealing member bridging the gap across and under the steps having tongues on its inner ends engaging in the grooves, one tongue and an adjacent portion of the member being secured in one of the grooves and its step and the other end of said member and its tongue being free.

2. A sealing ring as set forth in claim 1, wherein the outer vertical edges of the ring are beveled.

3. A sealing ring as set forth in claim 1, wherein the outer vertical edges of the ring and the block are beveled.

4. A sealing ring including, a radially split annulus having a radial gap at its split provided with rectilinear unbroken vertical walls extending from its inner face to its outer face and downwardly below its center, whereby the upper surface of the annulus is unbroken on each side of the gap, said annulus being undercut in its bottom on each side of the gap to form overhanging steps on each side of said gap and having underlying inner grooves, and a flat block disposed in the undercut bottom of the annulus bridging the gap and having tongues on its rear side engaging in the grooves of the annulus, the gap being open above the block.

5. A sealing ring as set forth in claim 4, wherein the grooves are confined to the inner side of the annulus.

6. A sealing ring as set forth in claim 4, wherein the block is less than half the vertical thickness of the annulus and the inner tongues on its inner side extend circumferentially on each side beyond its outer portion.

7. A sealing ring as set forth in claim 4, wherein one tongue and that portion of the block from which it extends are fixed under one of the steps and in the groove extending therefrom.

WILLIAM T. GREEN.

REFERENCES CITED

The following references are of record in the file of this patent:

UNITED STATES PATENTS

| Number | Name | Date |
|---|---|---|
| 393,556 | Gutierrez | Nov. 27, 1888 |
| 722,440 | Wilson | Mar. 10, 1903 |
| 1,195,279 | Shierk | Aug. 22, 1916 |
| 1,369,075 | Balman | Feb. 22, 1921 |
| 1,975,344 | Baker | Oct. 2, 1934 |
| 2,412,734 | Iliffe | Dec. 17, 1946 |